(12) United States Patent
Han et al.

(10) Patent No.: US 9,272,637 B2
(45) Date of Patent: Mar. 1, 2016

(54) STRUCTURE FOR REINFORCING SEAT MOUNTING PORTION OF VEHICLE BODY

(71) Applicant: Hyundai Motor Company, Seoul (KR)

(72) Inventors: Yoonkyoung Han, Whasung-Si (KR); Mun Soo Cha, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/485,325

(22) Filed: Sep. 12, 2014

(65) Prior Publication Data

US 2015/0166120 A1 Jun. 18, 2015

(30) Foreign Application Priority Data

Dec. 18, 2013 (KR) ........................ 10-2013-0158644

(51) Int. Cl.
| | | |
|---|---|---|
| *B62D 25/00* | (2006.01) | |
| *B60N 2/005* | (2006.01) | |
| *B62D 25/20* | (2006.01) | |

(52) U.S. Cl.
CPC ............ *B60N 2/005* (2013.01); *B62D 25/2036* (2013.01)

(58) Field of Classification Search
CPC ... B62D 25/025; B62D 25/2036; B60N 2/005
USPC ............. 296/187.08, 187.12, 193.07, 209, 63
See application file for complete search history.

(56) References Cited

U.S. PATENT DOCUMENTS

| | | | |
|---|---|---|---|
| 2009/0066118 A1* | 3/2009 | Tosaka et al. ................. | 296/204 |
| 2010/0078966 A1* | 4/2010 | Onoda et al. ............. | 296/193.07 |
| 2010/0156146 A1* | 6/2010 | Matsuyama ............. | 296/193.07 |
| 2011/0210582 A1* | 9/2011 | Mori ........................ | 296/193.07 |
| 2013/0049407 A1* | 2/2013 | Kageyama .................... | 296/204 |
| 2014/0306485 A1* | 10/2014 | Bechtler et al. .......... | 296/187.08 |
| 2014/0327268 A1* | 11/2014 | Mori ........................ | 296/187.08 |
| 2015/0145288 A1* | 5/2015 | Kellner ................ | B62D 25/025 |

FOREIGN PATENT DOCUMENTS

| | | |
|---|---|---|
| JP | 3381700 B2 | 12/2002 |
| JP | 3865178 B2 | 10/2006 |
| KR | 1998-029247 A | 7/1998 |
| KR | 1999-0015176 U | 5/1999 |
| KR | 10-2011-0054339 A | 5/2011 |

\* cited by examiner

*Primary Examiner* — Jason S Morrow
(74) *Attorney, Agent, or Firm* — Morgan, Lewis & Bockius LLP

(57) ABSTRACT

A structure for reinforcing a seat mounting portion of a vehicle body may include a floor panel having a tunnel portion that protrudes in a height direction of a vehicle, side sill members extended in a length direction of the vehicle and coupled to the floor panel at both left and right sides in a width direction of the vehicle, a seat inner member coupled to the tunnel portion, a seat cross member extended in the width direction of the vehicle and having an outer tip portion coupled to the side sill members and an inner tip portion coupled to the seat inner member, a seat outer member coupled to the outer tip portion of the seat cross member and attached to the side sill members and the floor panel, and a reinforcing member inserted into the seat outer member to reinforce rigidity.

10 Claims, 5 Drawing Sheets

STRUCTURE FOR REINFORCING SEAT MOUNTING PORTION OF VEHICLE BODY

CROSS-REFERENCE TO RELATED APPLICATION

The present application claims priority of Korean Patent Application Number 10-2013-0158644 filed on Dec. 18, 2013, the entire contents of which application are incorporated herein for all purposes by this reference.

BACKGROUND OF INVENTION

1. Field of Invention

The present invention relates to a structure for reinforcing a seat mounting portion of a vehicle body, and more particularly, to a structure for reinforcing a seat mounting portion of a vehicle body, which may stably protect an occupant by stably supporting a seat on a vehicle body at the time of a frontal collision or broadside collision accident of the vehicle.

2. Description of Related Art

A seat of a vehicle in the related art is mounted and supported on a floor panel, which constitutes a bottom of the interior of the vehicle, in an internal space of the interior of the vehicle which is formed in a vehicle body.

The seat of the vehicle needs to be stably mounted and supported on the floor panel so that an occupant may be more stably seated on the seat. To this end, in the related art, separate mounting reinforcing members are used when the seat of the vehicle is mounted on the floor panel.

Among the seat mounting reinforcing members of the vehicle, there is a seat cross member that is formed to be extended in a width direction of the vehicle, and mounted on the floor panel. The seat cross member has a structure in which an approximate "⌐"-shaped cross section, which is opened toward a lower side of the vehicle, is formed to be extended in a length direction thereof.

An outer tip portion of the seat cross member in the width direction of the vehicle is attached to a side sill inner member that is formed to be extended in a length direction of the vehicle, and an inner tip portion of the seat cross member in the width direction of the vehicle is attached to a tunnel portion of the floor panel.

The side sill member is a constituent element of the vehicle body which is positioned outward in the width direction of the vehicle, and serves to absorb and reduce an impact at the time of a broadside collision accident of the vehicle, and a bulk head is inserted and mounted in the side sill member in order to reinforce rigidity of the side sill member.

In order to mount the seat of the vehicle, a seat mounting inner member and a seat mounting outer member are applied.

The seat mounting outer member, which has a structure that is extended in the length direction of the vehicle, is superposed on the outer tip portion of the seat cross member, and attached to an inner surface of the side sill member in the width direction of the vehicle, and the seat mounting inner member, which also has a structure that is extended in the length direction of the vehicle, is superposed on the inner tip portion of the seat cross member, and attached to the tunnel portion, such that the seat of the vehicle is mounted and supported on the seat mounting inner member and the seat mounting outer member.

The seat mounting outer member serves to reinforce the side sill member and absorb and disperse an impact at the time of a broadside collision accident of the vehicle, and the seat mounting inner member serves to disperse impact energy, which is transferred through the seat cross member, to the tunnel portion, and reinforce rigidity of the tunnel portion at the time of a broadside collision accident of the vehicle.

The seat cross member is typically made of a high tensile steel plate in order to cope with a broadside collision of the vehicle such that formability of the seat cross member deteriorates, and a length of a flange, which is adhered to the side sill member, is short such that it is difficult to perform welding, and as a result, there is a problem in that connection rigidity between the side sill member and the seat cross member deteriorates.

In addition, since the bulk head is locally inserted into the side sill member so as to reinforce the side sill member, which does not effectively handle a broadside collision, and as a result, there is a problem in that a connection part between the side sill member and the seat cross member easily buckles at the time of a broadside collision accident of the vehicle.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a structure for reinforcing a seat mounting portion of a vehicle body, which may provide seating stability to an occupant by stably supporting a seat of a vehicle on a vehicle body, and more safely protect the occupant by properly dispersing and absorbing impact energy at the time of a frontal collision or broadside collision accident of the vehicle.

Various aspects of the present invention provide a structure for reinforcing a seat mounting portion of a vehicle body, including: a floor panel which has a tunnel portion that protrudes in a height direction of a vehicle, and forms a bottom of a vehicle body; side sill members which are formed to be extended in a length direction of the vehicle, and are coupled to the floor panel at both left and right sides in a width direction of the vehicle; a seat inner member which is coupled to the tunnel portion, and on which a seat of the vehicle is mounted; a seat cross member which is disposed to be extended in the width direction of the vehicle, and has an outer tip portion that is coupled to the side sill members, and an inner tip portion that is coupled to the seat inner member; a seat outer member which is superposed on and coupled to the outer tip portion of the seat cross member, and attached to the side sill members and the floor panel, and on which the seat of the vehicle is mounted; and a reinforcing member which is inserted into the seat outer member to reinforce rigidity.

One or each of the side sill members may have a closed cross section that has a substantially quadrangular box shape and a continuous structure in a length direction sillthereof, and a plurality of ribs, which is extended upward and downward in the height direction of the vehicle and/or leftward and rightward in the width direction of the vehicle, may be provided in the one or each of the side sill members. The one or each of the side sill members may be integrally or monolithically made by an extrusion method.

The seat cross member may have a substantially "⌐"-shaped cross section that is opened downward in the height direction of the vehicle, and has a continuous structure in a length direction thereof, and the seat cross member may be made by a die casting method.

The seat cross member may include: a first coupling flange which is attached to an inner surface of one or each of the side sill members in the width direction of the vehicle; second coupling flanges which are formed to be extended in a length direction thereof at both edges in a width direction thereof to be attached to the floor panel; and a third coupling flange which is formed to be bent in a substantially " ⊏ " shape to be attached to an outer surface of the seat inner member in the width direction of the vehicle and an upper surface of the seat inner member in the height direction of the vehicle, respectively.

The reinforcing member may include: three longitudinal reinforcing members which are formed to be extended over substantially the entire length of the seat cross member, and disposed at first predetermined intervals in a width direction of the seat cross member; and three lateral reinforcing members which are formed to be extended in the width direction of the seat cross member, and disposed at second predetermined intervals in a length direction of the longitudinal reinforcing members.

A central lateral reinforcing member, which is positioned centrally among the lateral reinforcing members, may be extended while penetrating a front surface and a rear surface of the seat cross member in the length direction of the vehicle to form coupling projections that are coupled to the seat outer member.

Rigid coupling protrusions, which protrude while penetrating an upper surface of the seat cross member and have triangular shapes, may be formed on outer tip portions of the longitudinal reinforcing members in the width direction of the vehicle.

The seat outer member may include a plurality of coupling flanges that is superposed on the outer tip portion of the seat cross member, formed to come into close contact with an upper surface of the outer tip portion in the height direction of the vehicle and a front surface and a rear surface of the outer tip portion in the length direction of the vehicle, respectively, and attached to the seat cross member, the floor panel, and the side sill member, respectively.

The plurality of ribs may be connected to each other at a central connection portion.

According to the structure for reinforcing a seat mounting portion of a vehicle body according to various aspects of the present invention, the seat cross member is made by a die casting method such that a degree of design freedom may be improved, and the coupling flanges, which are provided to be coupled to the side sill member, may be formed to have a sufficient area such that connection rigidity between the side sill member and the seat cross member is increased, and support rigidity for the seat of the vehicle is increased.

In addition, the coupling flanges, which are formed on the outer surface of the seat cross member, increase connection rigidity with the seat outer member so as to suppress moment by which the seat of the vehicle and the seat outer member are rotated toward the front side of the vehicle at the time of a frontal collision accident of the vehicle, thereby stably supporting the seat of the vehicle.

The side sill member is made by an extrusion method, and the ribs, which are extended upward, downward, leftward, and rightward, are integrally formed in the side sill member, such that multiple cross sections are formed in the side sill member so as to increase structural rigidity of the side sill member, thereby effectively coping with a broadside collision accident of the vehicle, reducing the number of components such as a bulk head in the related art, and reducing the number of manufacturing processes.

Moreover, the reinforcing members, which are formed to be extended in the length and width directions thereof, are inserted into the seat cross member so as to effectively support the side sill member, prevent rotation of the side sill member, and effectively disperse an impact, which is transmitted through the side sill member, in forward, rearward, leftward, and rightward directions of the vehicle body, at the time of a broadside collision accident of the vehicle, thereby stably protecting the seat of the vehicle and the occupant from the collision accident.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Figure 1:
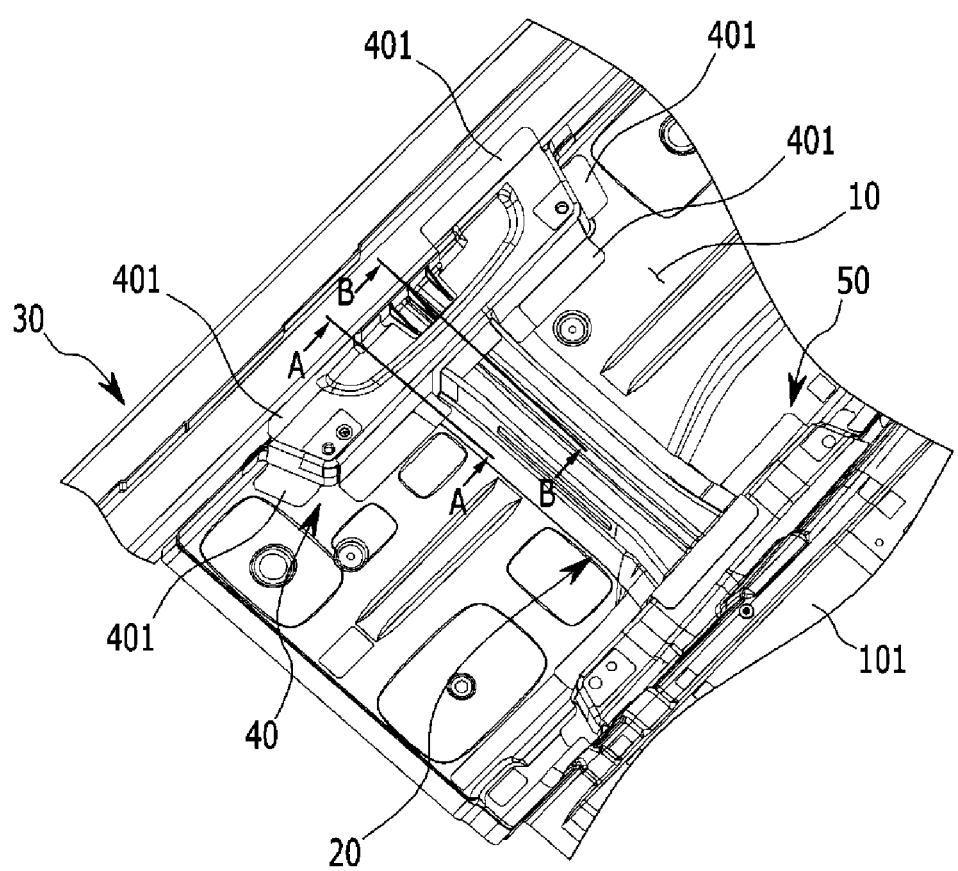
FIG. 1 is a perspective view illustrating an exemplary structure for reinforcing a seat mounting portion of a vehicle body, in which a seat cross member is mounted on a side sill member and a floor panel, in accordance with the present invention.

Referring to FIG. 1, a structure for reinforcing a seat mounting portion of a vehicle body according to various embodiments of the present invention may include a seat cross member 20 that is disposed on a floor panel 10 in a width direction of a vehicle. The seat cross member 20 may have an approximate " ⊏ "-shaped cross section that is opened downward in a height direction of the vehicle and has a continuous structure in a length direction thereof.

A side sill member 30, which is formed to be extended in a length direction of the vehicle, is attached to the floor panel 10. A tunnel portion 101, which protrudes upward in the height direction of the vehicle, may be formed on the floor panel 10. An outer tip portion of the seat cross member 20 in the width direction of the vehicle may be attached to the side sill member 30. A seat outer member 40 may be attached to the seat cross member 20 and the side sill member 30 in a state in which the seat outer member 40 is superposed on the outer tip portion of the seat cross member 20. A seat inner member 50 may be attached to the seat cross member 20 and the tunnel portion 101, and an inner tip portion of the seat cross member 20 in the width direction of the vehicle may be attached to the seat inner member 50.

Figure 2:
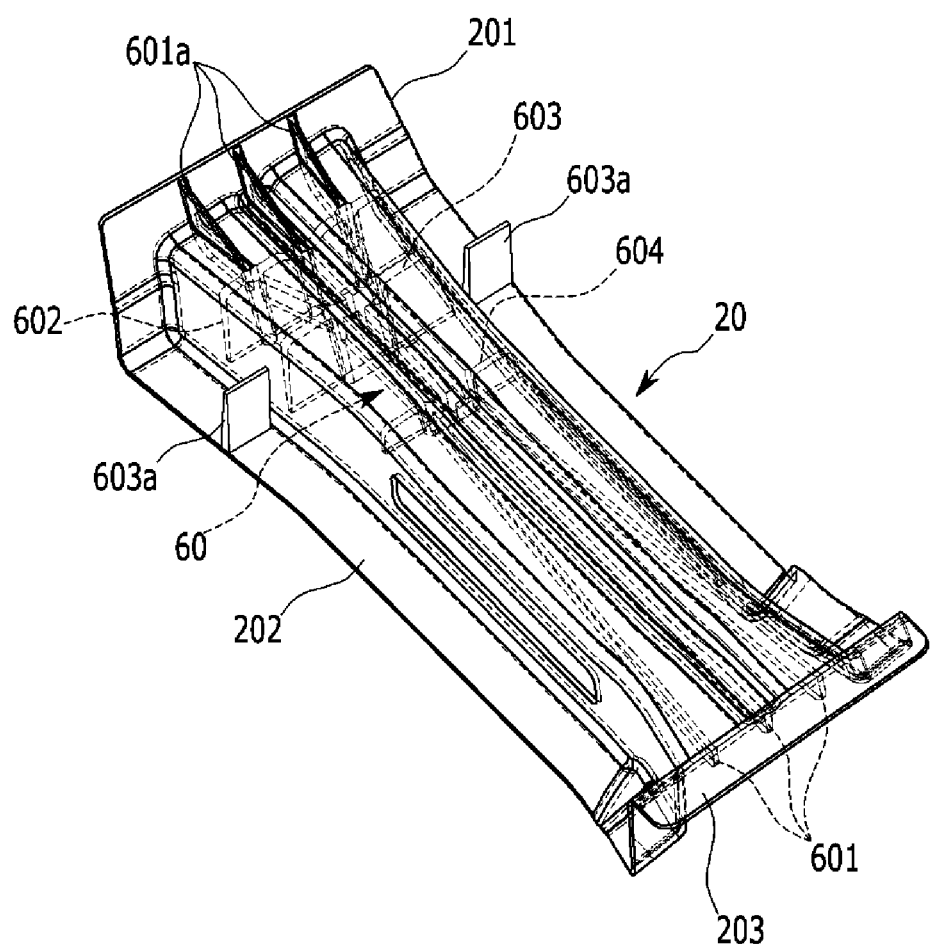
FIG. 2 is a projection perspective view of an exemplary seat cross member according to the present invention.
Figure 3:
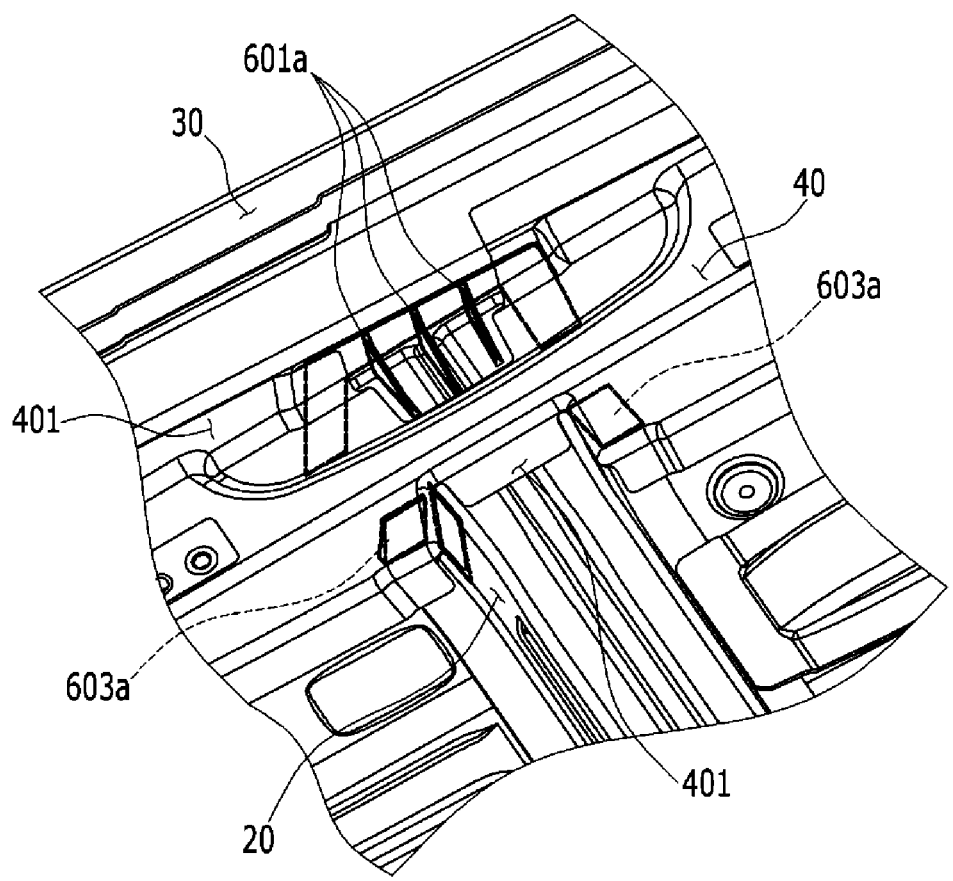
FIG. 3 is an enlarged perspective view of an exemplary connection part between a seat cross member and a side sill member according to the present invention.
Figure 4:
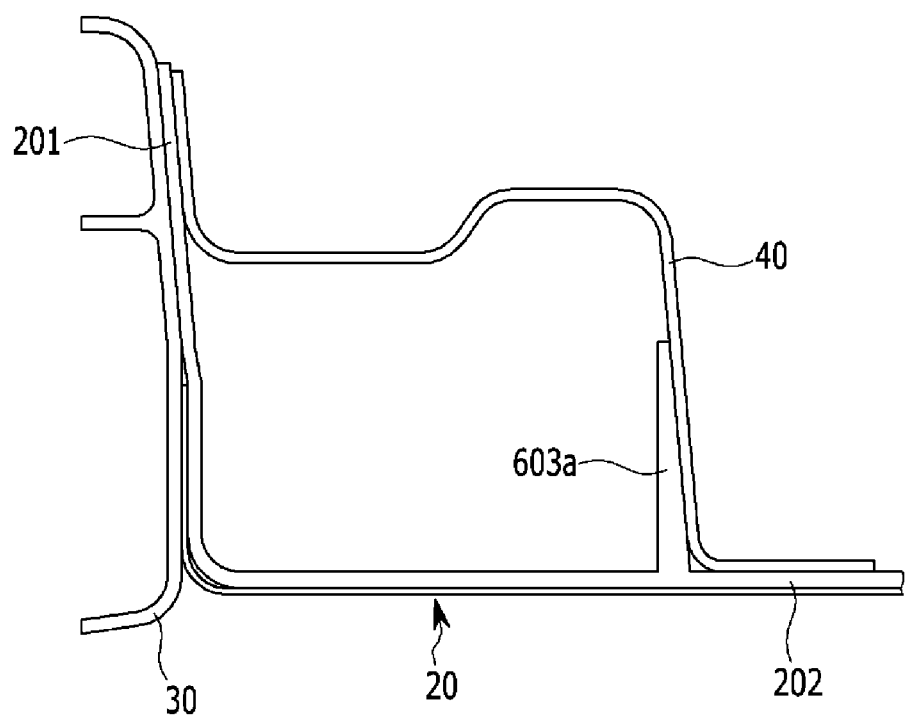
FIG. 4 is a cross-sectional view taken along line A-A of FIG. 1.

Referring to FIG. 2, the seat cross member 20 may include a first coupling flange 201 which is attached to an inner surface of the side sill member 30 in the width direction of the vehicle, second coupling flanges 202 which are formed to be extended in a length direction thereof at both edges in a width direction thereof so as to be attached to the floor panel 10, and a third coupling flange 203 which is formed to be bent in an approximate "⊏" shape so as to be attached to an outer surface of the seat inner member 50 in the width direction of the vehicle and an upper surface of the seat inner member 50 in the height direction of the vehicle, respectively.

A reinforcing member 60 may be inserted into the seat cross member 20 and integrally coupled to the seat cross member 20 in order to reinforce structural rigidity. The reinforcing member 60 may include a plurality of longitudinal reinforcing members such as three longitudinal reinforcing members 601 which are formed to be extended over or substantially over the entire length of the seat cross member 20, and disposed at predetermined intervals in a width direction of the seat cross member 20, and a plurality of lateral reinforcing members such as three lateral reinforcing members 602, 603, and 604 which are formed to be extended in the width direction of the seat cross member 20, and disposed at predetermined intervals in a length direction of the longitudinal reinforcing members 601.

The longitudinal reinforcing members 601 serve to reinforce rigidity in the length direction of the seat cross member 20, and the lateral reinforcing members 602, 603, and 604 serve to support the longitudinal reinforcing members 601 together, and reinforce rigidity in the width direction of the seat cross member 20.

The central lateral reinforcing member 603, which is positioned centrally among the lateral reinforcing members 602, 603, and 604, is extended while penetrating a front surface and a rear surface of the seat cross member 20 in the length direction of the vehicle so as to form coupling projections 603a.

The coupling projections 603a may be entirely covered by the seat outer member 40, and for example, fastened by riveting, thereby improving connectivity between the seat outer member 40 and the seat cross member 20.

Outer tip portions of the longitudinal reinforcing members 601 in the width direction of the vehicle may include rigid coupling protrusions 601a that protrude while penetrating an upper surface of the seat cross member 20, and have triangular shapes. The rigid coupling protrusions 601a serve to reinforce rigidity of the longitudinal reinforcing members 601, and improve connectivity between the longitudinal reinforcing members 601 and the seat cross member 20.

Referring to FIGS. 1 to 4, the seat outer member 40 has a plurality of coupling flanges 401 that is superposed on the outer tip portion of the seat cross member 20, formed to come into close contact with an upper surface of the outer tip portion in the height direction of the vehicle and a front surface and a rear surface of the outer tip portion in the length direction of the vehicle, respectively, and attached to the seat cross member 20, the floor panel 10, and the side sill member 30, respectively.

Figure 5:
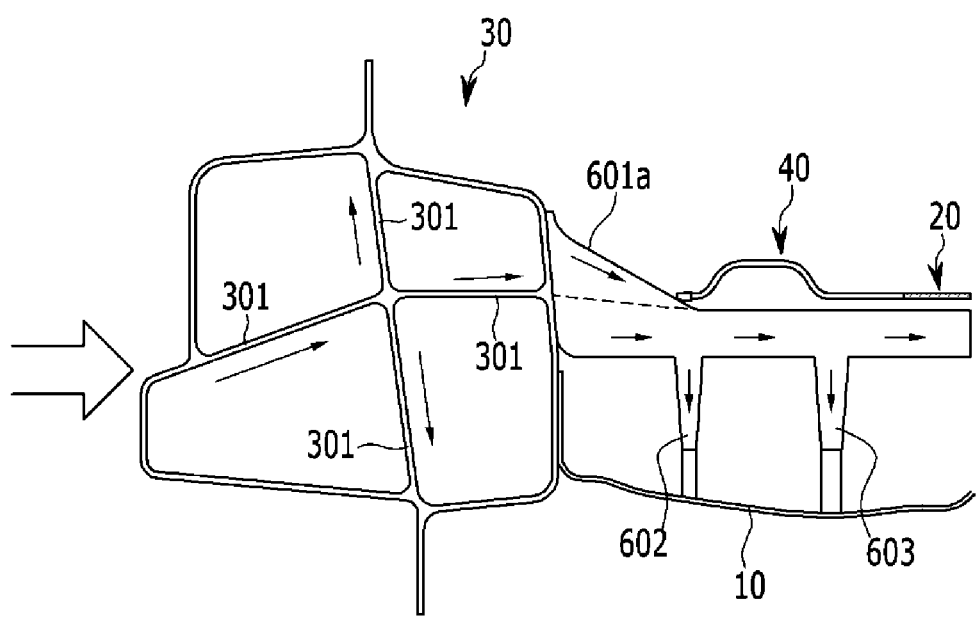
FIG. 5 is a cross-sectional view taken along line B-B of FIG. 1.

Referring to FIG. 5, the side sill member 30 may have a closed cross section that has approximately a quadrangular box shape and a continuous structure in a length direction thereof.

Ribs 301, which are extended upward and downward in the height direction of the vehicle and leftward and rightward in the width direction of the vehicle, that is, in four directions, are provided in the side sill member 30. The ribs 301 may be connected to each other at a central connection portion. The ribs such as four ribs 301 may be formed to be extended in the length direction of the side sill member 30.

The side sill member 30 may be made by an extrusion method, and rigidity is increased by the plurality of ribs 301 formed in the side sill member 30 such that a rigid reinforcing member such as a bulk head in the related art is not necessary, and a dual member structure of a side sill inner member and a side sill outer member in the related art is substituted by a single member structure, thereby reducing the number of components and manufacturing processes.

The seat cross member 20 may be made by a die casting method in order to improve a degree of design freedom and reinforce rigidity, and coupled to the side sill member 30 through the first coupling flange 201 having a wide area, thereby increasing connection rigidity between the seat cross member 20 and the side sill member 30.

In a case in which the vehicle having the aforementioned structure undergoes a broadside collision accident, as illustrated by arrows in FIG. 5, the side sill member 30 first absorbs and reduces an impact while being deformed by receiving the impact, the respective ribs 301 of the side sill member 30 disperse impact energy upward, downward, leftward and rightward and absorb impact energy, and impact energy, which is not absorbed by the side sill member 30, is transferred and dispersed to the seat cross member 20 and the reinforcing member 60 thereof through the side sill member 30.

The rigid coupling protrusions 601a of the reinforcing member 60 serve to prevent the side sill member 30 from being rotated toward the inside of the vehicle body, the lateral reinforcing members 602, 603, and 604 disperse the transferred impact energy forward and rearward in the length direction of the vehicle so as to prevent buckling due to rotation of the side sill member 30, and the longitudinal reinforcing members 601 serve to transfer and disperse impact energy inward in the width direction of the vehicle.

The second lateral reinforcing member 603, which is positioned centrally among the lateral reinforcing members, serves to increase connection rigidity with the seat outer member 40, prevent a seat and the seat outer member 40 from being rotated toward the front side of the vehicle at the time of a frontal collision accident of the vehicle, and transfer and disperse impact energy to the seat outer member 40.

For convenience in explanation and accurate definition in the appended claims, the terms "outer" or "inner", "front" or "rear", "downward" or "upward", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A structure for reinforcing a seat mounting portion of a vehicle body, comprising:

a floor panel which has a tunnel portion that protrudes in a height direction of a vehicle, and forms a bottom of a vehicle body;

side sill members which are formed to be extended in a length direction of the vehicle, and are coupled to the floor panel at both left and right sides in a width direction of the vehicle;

a seat inner member which is coupled to the tunnel portion, and on which a seat of the vehicle is mounted;

a seat cross member which is disposed to be extended in the width direction of the vehicle, and has an outer tip portion that is coupled to a side sill member of the side sill members, and an inner tip portion that is coupled to the seat inner member;

a seat outer member which is superposed on and coupled to the outer tip portion of the seat cross member, and attached to the side sill members and the floor panel, and on which the seat of the vehicle is mounted; and a reinforcing member which is inserted into the seat outer member to reinforce rigidity.

2. The structure of claim 1, wherein:

one or each of the side sill members has a closed cross section that has a substantially quadrangular box shape and a continuous structure in a length direction thereof, and a plurality of ribs, which is extended upward and downward in the height direction of the vehicle and/or leftward and rightward in the width direction of the vehicle, is provided in the one or each of the side sill members.

3. The structure of claim 2, wherein:

the one or each of the side sill members is integrally or monolithically made by an extrusion method.

4. The structure of claim 1, wherein:

the seat cross member has a substantially "⊏"-shaped cross section that is opened downward in the height direction of the vehicle, and has a continuous structure in a length direction thereof, and the seat cross member is made by a die casting method.

5. The structure of claim 4, wherein the seat cross member includes:

a first coupling flange which is attached to an inner surface of the side sill member in the width direction of the vehicle;

second coupling flanges which are formed to be extended in a length direction thereof at both edges in a width direction thereof to be attached to the floor panel; and a third coupling flange which is formed to be bent in a substantially "⊏" shape to be attached to an outer surface of the seat inner member in the width direction of the vehicle and an upper surface of the seat inner member in the height direction of the vehicle, respectively.

6. The structure of claim 4, wherein the reinforcing member includes:

three longitudinal reinforcing members which are formed to be extended over substantially the entire length of the seat cross member, and disposed at first predetermined intervals in a width direction of the seat cross member; and three lateral reinforcing members which are formed to be extended in the width direction of the seat cross member, and disposed at second predetermined intervals in a length direction of the longitudinal reinforcing members.

7. The structure of claim 6, wherein:

a central lateral reinforcing member, which is positioned centrally among the lateral reinforcing members, is extended while penetrating a front surface and a rear surface of the seat cross member in the length direction of the vehicle to form coupling projections that are coupled to the seat outer member.

8. The structure of claim 7, wherein:

rigid coupling protrusions, which protrude while penetrating an upper surface of the seat cross member and have triangular shapes, are formed on outer tip portions of the longitudinal reinforcing members in the width direction of the vehicle.

9. The structure of claim 1, wherein:

the seat outer member includes a plurality of coupling flanges that is superposed on the outer tip portion of the seat cross member, formed to come into close contact with an upper surface of the outer tip portion in the height direction of the vehicle and a front surface and a rear surface of the outer tip portion in the length direction of the vehicle, respectively, and attached to the seat cross member, the floor panel, and the side sill member, respectively.

10. The structure of claim 2, wherein:

the plurality of ribs is connected to each other at a central connection portion.

* * * * *